United States Patent Office 3,014,030
Patented Dec. 19, 1961

3,014,030
9α-METHYLPREGNENES, PREGNADIENES AND INTERMEDIATES THEREFOR
Philip F. Beal III, Kalamazoo, and John A. Hogg, Kalamazoo Township, Kalamazoo County, Mich., assignors to The Upjohn Company, Kalamazoo, Mich., a corporation of Delaware
No Drawing. Filed Aug. 19, 1959, Ser. No. 834,657
5 Claims. (Cl. 260—239.55)

This invention relates to novel steroid compounds and is more particularly concerned with 9α-methylhydrocortisone and 21-acylates thereof, 9α-methylcortisone and 21-acylates thereof, 9α-methyl-11β,17α-dihydroxyprogesterone, 9α-methyl-11-keto-17α-hydroxyprogesterone and the corresponding 1-dehydro analogues of all of these products.

The novel end products of this invention, 9α-methylhydrocortisone and 21-acylates thereof (XXIV), 9α-methylcortisone and 21-acylates thereof (XXIV–11=0), 9α-methyl-11β,17α-dihydroxyprogesterone (XXIVc), 9α-methyl-11-keto-17α-hydroxyprogesterone (XXIVd) and the corresponding 1-dehydro analogues of all of these compounds, possess valuable anti-inflammatory, central nervous system depressing, pituitary inhibiting and salt and water regulating activity of improved therapeutic ratio. The intermediates, 9α-methyl-4,7-pregnadiene-3,11,20-trione (VI), 9α-methyl-4,7-pregnadiene-11β-hydroxy-3,20-dione (VIII) and 9α-methyl-5α,8α-dihydroxy-6-pregnene-3,11,20-trione (XV), possess central nervous system depressing, muscle relaxing, salt and water regulating and pituitary suppressing activity of improved therapeutic ratio.

Compositions containing the compounds of this invention can be prepared for human or animal use by incorporating them in any of the several dosage forms such as pills, tablets, capsules, solutions or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides, or other materials forming advantageous combinations therewith.

The new compounds and processes of this invention are illustratively represented by the following formulae:

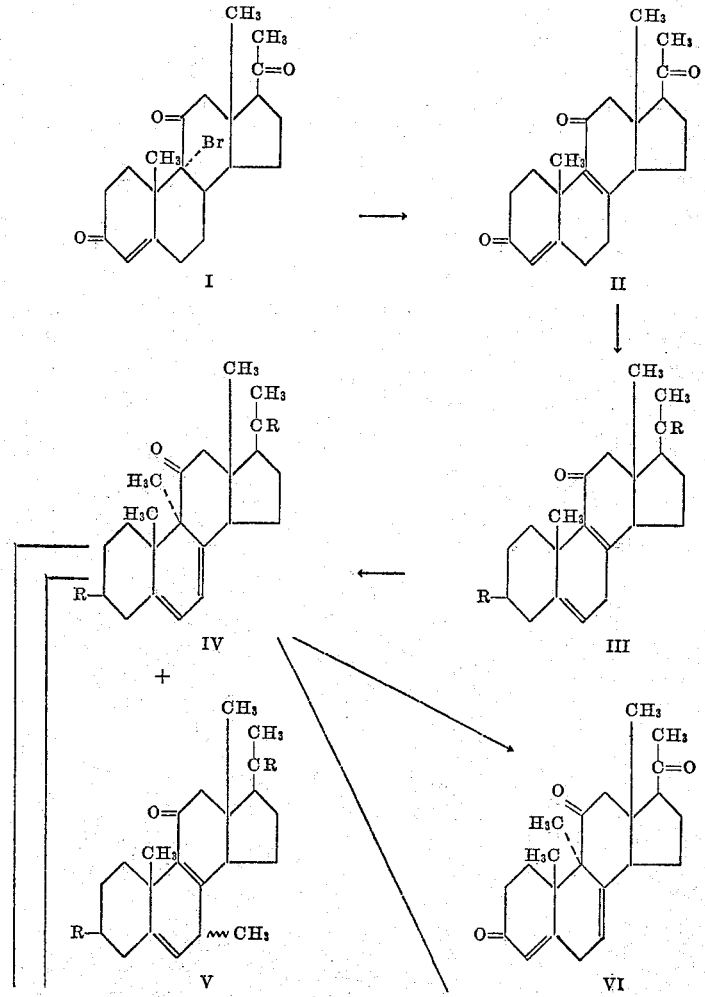

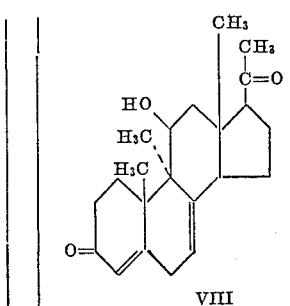
VIII
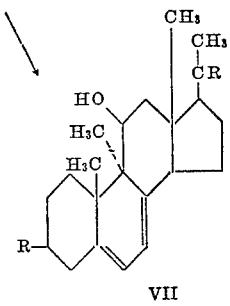
VII
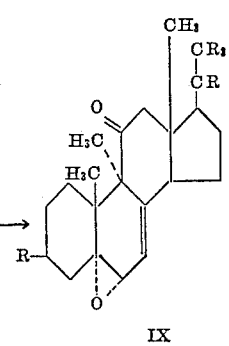
IX
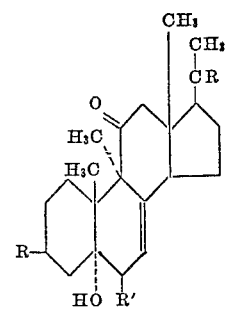
X
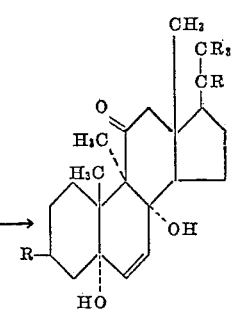
XIV
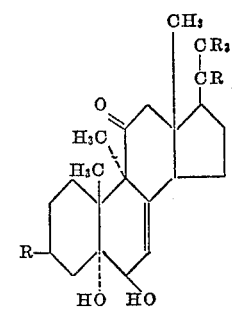
XI
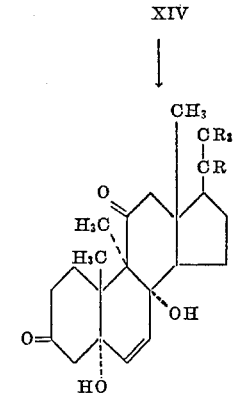
XV
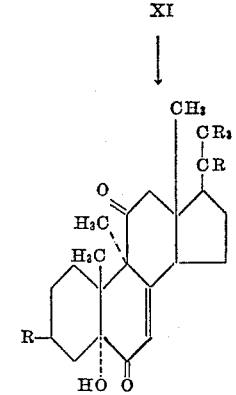
XII
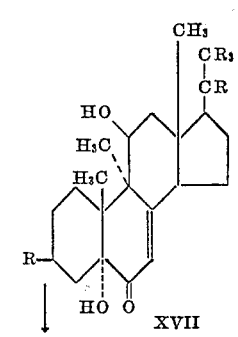
XVII
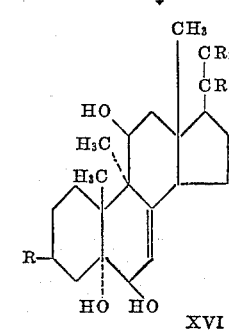
XVI

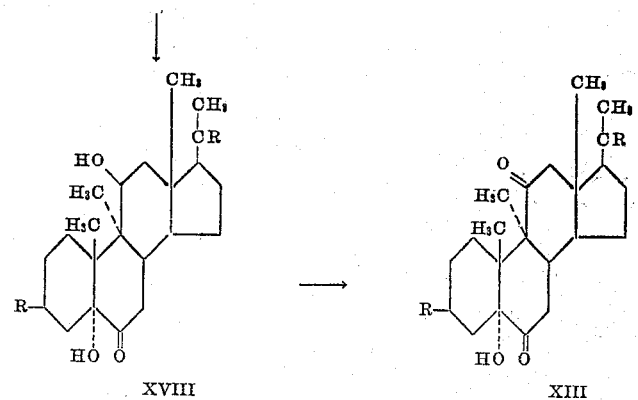
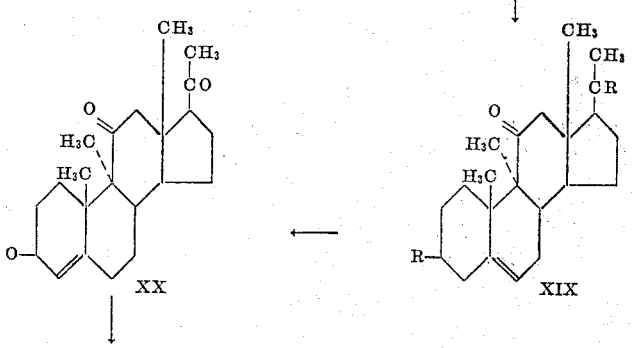
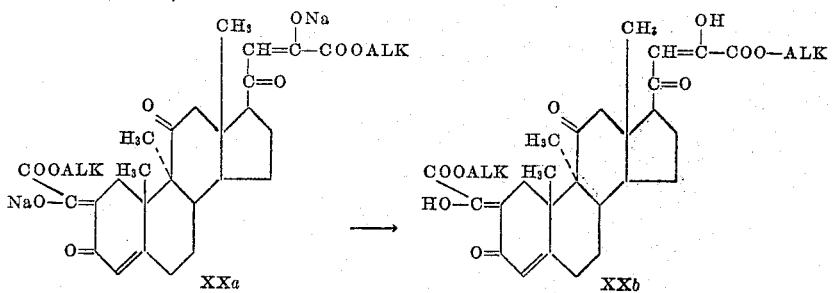
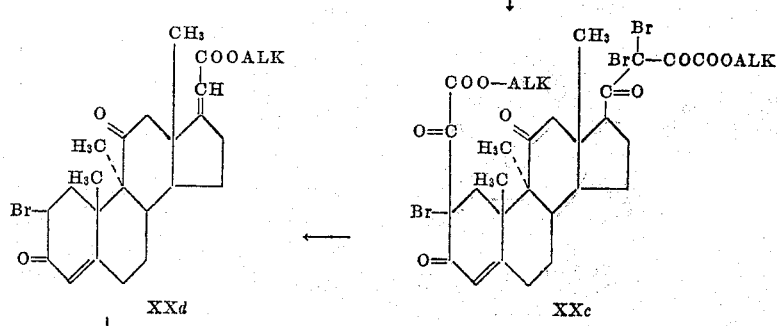
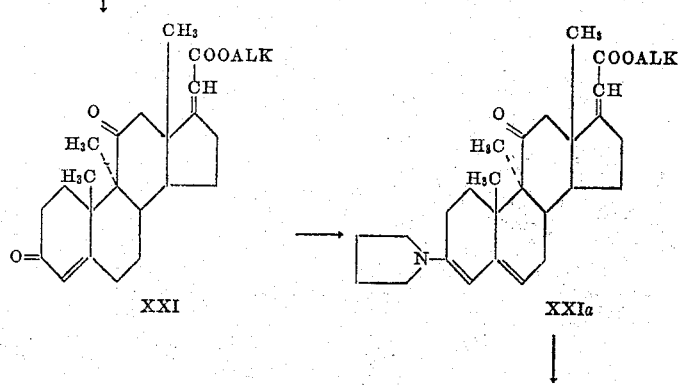

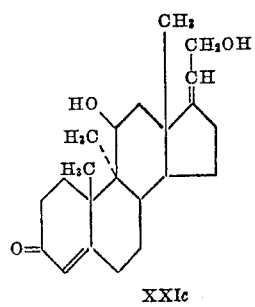
XXIc
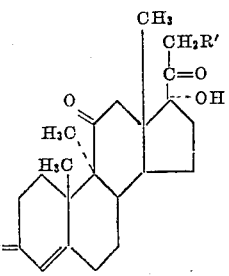
XXIb
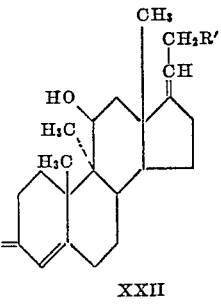
XXII
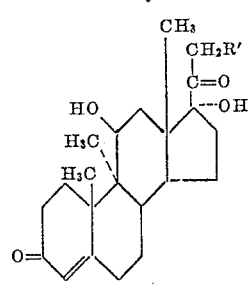
XXIII-11=O
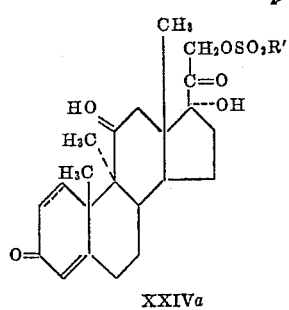
XXIII
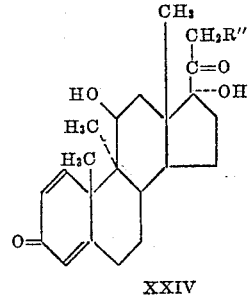
XXIV
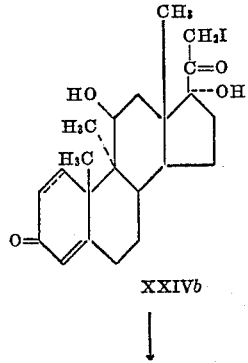
XXIVa
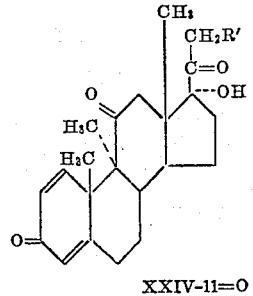
XXIV-11=O
XXIVb

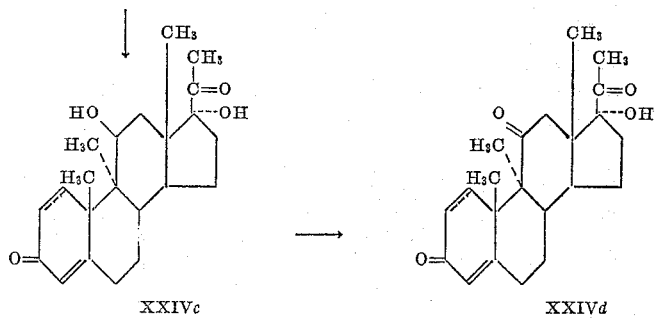

XXIVc → XXIVd wherein R is a cyclic ketal radical of the formula:

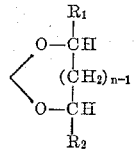

wherein $n$ is the integer one or two and $R_1$ and $R_2$ are hydrogen or lower-alkyl containing from one to six carbon atoms, inclusive, e.g., methyl, ethyl, propyl, isopropyl, butyl, 1-methylpropyl, amyl, hexyl, etc., the 1,2-alkylene ketals being preferred; R in the 3-position can also be OAcyl, the term Acyl representing the acyl radical of a hydrocarbon carboxylic acid containing from one to twelve carbon atoms, inclusive, R' is selected from the group consisting of hydroxy and OAcyl, the term Acyl representing the acyl radical of a hydrocarbon carboxylic acid containing from one to twelve carbon atoms, inclusive, R" is alkyl or aryl, e.g., a hydrocarbon radical containing from 1 to 12 carbon atoms, inclusive, and ALK is a lower-alkyl group containing from one to eight carbon atoms, inclusive, and the broken line in the 1,2-position represents a single or double bond.

As used in this application, the Roman numeral following the name of a compound (or compounds) indicates the relation of the compound (or compounds) to the reaction scheme depicted above.

The starting steroid for the compounds and process of this invention is 4,8(9)-pregnadiene-3,11,20-trione (II), prepared in accordance with the procedures of Preparations 1 and 2. The known compound, 9α-bromo-11β-hydroxy-4-pregnene-3,20-dione, is oxidized to form the corresponding 11-keto compound, 9α-bromo-4-pregnene-3,11,20-trione (I), which on reaction with collidine under an atmosphere of nitrogen yields 4,8(9)-pregnadiene-3,11,20-trione (II).

The process of the present invention comprises treating the compound of Formula II, 4,8(9)-pregnadiene-3,11,20-trione (prepared according to the procedure disclosed in U.S. Patent No. 2,835,680) with ethylene glycol in the presence of a strong acid catalyst, such as toluenesulfonic acid, ortho-chlorobenzenesulfonic acid, sulfuric acid, or the like, to obtain 5,8(9)-pregnadiene-3,11,20-trione 3,20-bis(ethylene ketal), Formula III, which is recovered by conventional means, for example, chromatography and/or crystallization.

Similarly, the compound of Formula II can be reacted with other 1,2-alkane diols or 1,3-alkane diols such as propylene glycol, propane-1,3-diol, 2,2-dimethylpropane-1,3-diol, butane-1,2-diol, butane-1,3-diol, pentane-1,2- and 1,3-diol, hexane-1,2- and 1,3-diol, heptane-1,2- and 1,3-diol or other alkane diols of the formula:

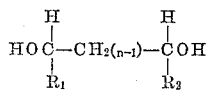

wherein $n$ is an integer having a value of from 1 to 2, inclusive, and $R_1$ and $R_2$ are selected from the group consisting of hydrogen and lower alkyl radicals containing up to 6 carbon atoms, and wherein the total number of carbon atoms in the alkane diol is up to and including 8 carbon atoms, to obtain the corresponding 3,20-bis(alkylene ketals) of 5,8(9)-pregnadiene-3,11,20-trione (III).

The compounds of Formula III are then treated with a methyl halide in the presence of a lower-alkyl alcohol, such as methyl, ethyl, propyl, isopropyl, butyl, isobutyl, tertiary butyl alcohol, or the like, and a base catalyst, such as an alkali metal lower alkoxide, such as sodium, potassium, or lithium methoxide, ethoxide, propoxide, isopropoxide, butoxide, isobutoxide, tertiary butoxide, and the like, or trityl sodium, trityl potassium, and trityl lithium, to convert them into the compounds of Formula IV, for example, 9α-methyl-5,7-pregnadiene-3,11,20-trione 3,20-bis(ethylene ketal) [or other 3,20-bis(alkylene ketals)], and the compounds of Formula V, for example, 7-methyl-5,8(9)-pregnadiene-3,11,20-trione 3,20-bis(ethylene ketal) [or other 3,20-bis(alkylene ketals)].

The preferred method for the conversion of the compounds of Formula III to the compounds of Formulae IV and V is to carry out the reaction with methyl iodide in the presence of tertiary butyl alcohol using potassium tertiary butoxide as the catalyst. The compounds of Formula IV are separated from the compounds of Formula V by conventional means, such as chromatography, and/or crystallization and the like.

The thus-obtained compounds of Formula IV are used for conversion to the compounds represented by Formulae VI, VII, IX, and XIV.

The compounds of Formula IV dissolved in an inert organic solvent such as ethanol, by treatment with an aqueous acid, preferably a mineral acid such as sulfuric acid, neutralization of the reaction mixture with an alkali metal bicarbonate solution, followed by extraction with a solvent such as methylene chloride, evaporation of the solvent and chromatography yield the compounds of Formula VI, e.g., 9α-methyl-4,7-pregnadiene-3,11,20-trione.

The compounds of Formula IV dissolved in ether or another suitable solvent are reduced with a reducing agent such as lithium aluminum hydride in benzene or other satisfactory liquid media. Isolation from the reaction mixture and purification of the product by conventional means, yields compounds represented by Formula VII, e.g., 9α-methyl-5,7-pregnadiene-11β-hydroxy-3,20-dione 3,20-bis(ethylene ketal). Removal of the 3,20-bis(alkylene ketal) groups is readily effected by treatment of the compounds of Formula VII with a mineral acid such as sulfuric acid in the conventional manner of hydrolyzing ketals to yield the compound represented by Formula VIII, e.g., 9α-methyl-4,7-pregnadiene-11β-hydroxy-3,20-dione.

The compounds of Formula IV are converted by epoxidation to the compounds of Formula IX. Epoxidizing agents such as organic carboxylic peracids, e.g., peracetic or perbenzoic acid, produce the corresponding 5,6-oxides, e.g., 9α-methyl-5,6-oxido-7-pregnene-3,11,20-trione 3,20-bis(ethylene ketal), by reaction with the compounds of Formula IV. Reaction of the compounds of Formula IV with the same reagents employed to produce the compounds of Formula IX, but carrying out the reaction at somewhat higher temperatures than those employed to produce the compounds of Formula IX, is productive of compounds represented by Formula XIV, e.g., 9α-methyl- 5α,8α-dihydroxy-6-pregnene-3,11,20-trione 3,20-bis(ethylene ketal). Removal of the 3,20-bis(alkylene ketal) groups is readily effected by treating the compounds of Formula XIV with a mineral acid such as sulfuric or hydrochloric acid in the conventional manner of hydrolyzing ketals to yield compounds represented by Formula XV, e.g., 9α-methyl-5α,8α-dihydroxy-6-pregnene-3,11,20-trione.

The compounds of Formula IX are converted by acetolysis to the compounds of Formula X. For example, 9α - methyl - 5,6-oxido-7-pregnene-3,11,20-trione 3,20-bis (ethylene ketal) (IX) dissolved in acetic anhydride is reacted at very low (Dry Ice) temperature with boron trifluoride etherate and following conventional neutralization, extraction and isolation procedures yields 9α-methyl-5 - hydroxy - 6-acetoxy-7-pregnene-3,11,20-trione 3,20-bis (ethylene ketal) (X). The compounds represented by Formula X are readily transformed to the compounds of Formula XI by procedures well known in the steroid art, e.g., reaction under nitrogen of a methanol solution of 9α-methyl-5-hydroxy-6-acetoxy-7-pregnene-3,11,20-trione 3,20-bis(ethylene ketal) (X) with an alkali such as sodium hydroxide is productive of 9α-methyl-5,6-dihydroxy-7-pregnene-3,11,20-trione 3,20-bis(ethylene ketal) (XI). Reaction of the compounds of Formula XI with a suitable oxidant such as manganese dioxide, selectively converts the 6-hydroxyl (6—OH) to 6-keto (6=O) without alteration of the remainder of the steroid molecule, e.g., 9α-methyl-5,6-dihydroxy-7-pregnene-3,11,20-trione 3,20-bis (ethylene ketal) (XI) is converted to 9α-methyl-5-hydroxy-7-pregnene-3,6,11,20-tetrone 3,20-bis(ethylene ketal) (XII). The compounds of Formula XII can be converted directly by suitable reducing agents (e.g., lithium aluminum hydride) to the compounds of Formula XVII, e.g., 9α-methyl-5,11-dihydroxy-7-pregnene-3,6,20-trione-3,20-bis(ethylene ketal). The intermediate, 9α-methyl-5,6,11-trihydroxy-7-pregnene-3,20-dione 3,20-bis (ethylene ketal) (XVI), formed in the course of the conversion of the compounds of Formula XII to those of Formula XVII need not be isolated and purified. The compounds of Formula XVI can also be prepared directly from those of Formula X. For example, reacting 9α-methyl - 5 - hydroxy - 6-acetoxy-7-pregnene-3,11,20-trione 3,20-bis(ethylene ketal) (X) with lithium aluminum hydride, followed by conventional isolation and crystallization procedures is productive of 9α-methyl-5,6,11-trihydroxy - 7-pregnene-3,20-dione 3,20-bis(ethylene ketal) (XVI). The compounds represented by Formula XVI can be converted by suitable oxidants to the compounds of Formula XVII. For example, reacting a solution of 9α-methyl - 5,6,11-trihydroxy-7-pregnene-3,20-dione 3,20-bis (ethylene ketal) (XVI) with manganese dioxide yields 9α-methyl-5,11-dihydroxy-7-pregnene-3,6,20-trione 3,20-bis(ethylene ketal) (XVII). The compounds of Formula XVII can be oxidized with chromium trioxide in pyridine to yield the corresponding 11-keto compounds of Formula XII.

Saturation of the 7(8)-double bond in the compounds of Formula XVII yields the compounds of Formula XVII. For example, addition of a solution of 9α-methyl-5α,11β-dihydroxy-7-pregnene-3,6,20-trione 3,20-bis(ethylene ketal) (XVII) to a solution of lithium in liquid ammonia yields 9α-methyl-5α,11β-dihydroxypregnane-3,6,20-trione 3,20-bis(ethylene ketal) (XVIII). Oxidation of the 11β-hydroxy group of the compounds of Formula XVIII, e.g., by reacting a pyridine solution of 9α-methyl-5α,11β-dihydroxypregnane-3,6,20-trione 3,20-bis(ethylene ketal) with chromic acid, is productive of 9α-methyl-5-hydroxypregnane - 3,6,11,20 - tetrone 3,20 - bis(ethylene ketal) (XIII).

The compounds of Formula XIII in suitable solvents, when reacted with appropriate reducing agents eliminate the 5-hydroxy and 6-keto substituents from the steroid nucleus with the formation of a 5(6)-double bond to give the compounds represented by Formula XIX. In the conventional manner well-known in the steroid art, the removal of the 3,20-bis(alkylene ketal) groups is readily effected by treatment of the compounds of Formula XIX with a mineral acid such as hydrochloric or sulfuric acid, to yield the compound represented by Formula XX, wherein the 4(5)-double bond replaces the 5(6)-double bond characterizing the compounds of Formula XIX. Thus, 9α - methyl - 5 - hydroxypregnane-3,6,11,20-tetrone 3,20-bis(ethylene ketal) (XIII) dissolved in ethylene glycol and absolute ethanol is reacted with hydrazine hydrate and potassium hydroxide to yield 9α-methyl-5-pregnene-3,11,20-trione 3,20-bis(ethylene ketal) (XIX). Reaction of this compound with hydrochloric acid, followed by neutralization, extraction and crystallization gives 9α-methyl-4-pregnene-3,11,20-trione (XX).

The compounds of Formula XX are converted to the compounds of Formula XXI (e.g., methyl, 9α-methyl-3,11 - diketo - 4,17(20)-pregnadien-21-oate) by reactions consisting of (1) diglyoxalation, (2) halogenation, (3) elimination and rearrangement and (4) dehalogenation. These procedures are disclosed in detail in U.S. Patent 2,790,814 of Hogg et al.

The compounds represented by Formula XXI are utilized in the production of the compounds of Formula XXII (e.g., 9α - methyl-11β,21-dihydroxy-4,17(20)-pregnadien-3-one 21-acetate) in the manner disclosed in detail by Magerlein and Hogg in U.S. Patent 2,781,343. While each of the steps of the process of this patent may be carried out individually, it is particularly adapted to unitary operation without isolation of intermediates. Thus, reaction of methyl, 9α-methyl-3,11-diketo-4,17(20)-pregnadien-21-oate (XXI) with a secondary cyclic alkylene amine, preferably in the presence of an acid catalyst, is productive of a 9α-methyl-3-amino-11-keto-3,5,17(20)-pregnatriene-21-oate (XXIa). Reduction of this ester with lithium aluminum hydride in an organic solvent followed by decomposition of any organo-metal complexes and excess lithium aluminum hydride present, produces a 9α - methyl - 3-amino-11,21-dihydroxy-3,5,17(20)-pregnatriene (XXIb). Hydrolysis of this compound yields 9α - methyl - 11,21-dihydroxy-4,17(20)-pregnadien-3-one (XXIc).

Compound XXIc can be esterified to form its 21-acyloxy derivative by reaction with the appropriate acid anhydride in pyridine at moderate temperatures, followed by the usual procedures of neutralization, extraction and crystallization to yield 9α-methyl-11β-hydroxy-21-acyloxy-4,17(20)-pregnadien-3-one (XXII). When acetic anhydride is employed the compound produced is 9α-methyl-11β,21 - dihydroxy-4,17(20)-pregnadien-3-one 21-acetate.

The oxidative hydroxylation reaction of the present invention converts the compounds of Formula XXII (e.g., 9α - methyl - 11β,21 - dihydroxy - 4,17(20)-pregnadien-3-one 21-acetate) to the compounds of Formula XXIII (e.g., 9α-methyl-11β-21-dihydroxy-4-pregnene-3-one 21-acetate) by reaction with a catalytic amount of osmium tetroxide and an oxygen donating oxidizing agent. Included among the oxidizing agents of this category are phenyl iodoso acetate, hydrogen peroxide, peracids, alkyl peroxides and amine oxide peroxides. The compounds represented by Formula XXIII are converted to the corresponding 11-keto compounds (XXIII–11=O) by reaction with chromium trioxide in glacial acetic acid or in the manner disclosed in U.S. Patent 2,751,402.

The compounds of Formula XXIII can also be prepared by the following alternative process. The known compound, 4-pregnene-3,11,20-trione (11-ketoprogesterone) is converted to methyl 3,11-diketo-4,17(20)-pregnadien-21-oate in the same manner as in the preparation of methyl 9α - methyl-3,11 - diketo - 4,17(20) - pregnadien-21-oate (XXI) from 9α-methyl-4-pregnene-3,11, 20 - trione (9α-methyl-11-ketoprogesterone) (XX) disclosed above. Methyl 3,11-diketo-4,17(20)-pregnadiene- 21-oate is converted by acetic anhydride to its 3-OAcylate (1) which has a double bond present at the 5(6)-position, and the 3-OAcylate is treated with sodium borohydride to obtain methyl 3β-hydroxy-11-keto-5,17(20)-pregnadien-21-oate. Allylic bromination at the 7-position of methyl 3β-hydroxy-11-keto-5(6),17(20)-pregnadien-21-oate, or its 3-acetate, with N-bromoacetamide followed by basic dehydrohalogenation with collidine yields methyl 3β-hydroxy-11-keto 5,7,17(20)-pregnatrien-21-oate, or its 3-acetate (2). Reaction of (2) with methyl iodide and sodium alkoxide results in its methylation at the 9-position to give 3β-hydroxy-9α-methyl-11-keto-5,7,17(20)-pregnatrien-21-oate (3), or its 3-acetate. The latter compound is treated with lithium aluminum hydride to obtain 3β,11β,21-trihydroxy-9α-methyl-5,7,17(20)-pregnatriene (4), which can be treated with an acid anhydride such as acetic anhydride to obtain the 21-acylate. Oppenauer oxidation of (4), or its 21-acylate, followed by treatment with a strong acid such as hydrochloric acid, or an alkali such as sodium methoxide, gives 9α-methyl-11β,21-dihydroxy-4,6,17(20)-pregnatrien-3-one (5) or its 21-acylate. Oxidative hydroxylation of (5) by reaction with osmium tetroxide and an amine oxide-hydrogen peroxide complex, e.g., N-methylmorpholine oxide-hydrogen peroxide complex gives 9α-methyl-11β,17α,21-trihydroxy-4,6-pregnadien-3-one (6) or its 21-acylate. The compounds represented by (6) can be reduced with hydrogen utilizing a catalyst such as palladium on carbon to yield 9α-methyl-11β,17α,21-trihydroxy4-pregnene-3,20-dione or its 21-acylate, e.g., 9α-methylhydrocortisone 21-acetate.

The 1-dehydrogenation of the compounds of Formula XXIII to the compounds of Formula XXIV can be carried out microbiologically, i.e., by fermentative 1-dehydrogenation using Septomyxa, Fusarium, Calonectria, Alternaria, Colletotrichum, Cylindrocarpon, Ophiobolus, Didymella, Corynebacterium, Listeria, Erysipelothrix, Mycobacterium, Tricothecium, Leptosphaeria, Cucurbitaria or Nocardia microorganisms in the manner disclosed in U.S. Patent 2,841,600. If loss of the 21-ester takes place during the fermentation, reacylation can be carried out by known 21-acylation methods. Alternatively, the 1-dehydrogenation can be carried out chemically in known manner by using selenium dioxide. The compounds of Formula XXIV, e.g., 9α-methyl-11β,17α-dihydroxy-21-acetoxy-1,4-pregnadiene-3,20-dione, can be oxidized to the corresponding 11-keto compounds by reaction with chromium trioxide in glacial acetic acid or with N-haloamides or N-haloimides in accordance with the method disclosed in U.S. Patent No. 2,813,108. Alternatively, the compounds of Formula XXIII—11=O can be subjected to 1-dehydrogenation in the same manner as disclosed above for the compounds of Formula XXIII. The compounds of Formulae XXIII, XXIII—11=O, XXIV and XXIV—11=O, wherein R′ is OAcyl, can be transformed to their respective free 21-alcohols by hydrolysis in accordance with known methods for hydrolyzing Compound F 21-esters to the free Compound F alcohol.

The compounds of Formulae XXIII or XXIV are converted to their corresponding 21-alkyl or aryl sulfonates by treatment with an organic sulfonyl halide such as methanesulfonyl chloride, toluenesulfonyl chloride, toluenesulfonyl bromide, benzenesulfonyl chloride, naphthylsulfonyl chloride, or the like, the methanesulfonic acid halides, especially methanesulfonyl chloride, being preferred. Thus, reaction of 9α-methyl-11β,17α,21-trihydroxy-4-pregnene-3,20-dione (XXIII-21—OH) or 9α-methyl-11β,17α,21-trihydroxy-1,4-pregnadiene-3,20-dione (XXIV) with methanesulfonyl chloride yields 9α-methyl-11β,17α,21-trihydroxy-4-pregnene-3,20-dione 21-methanesulfonate (XXIVa) or its 1-dehydro analogue.

The 21-iodo steroids of Formula XXIVb are prepared by reacting the 21-alkyl or aryl sulfonates of Formula XXIVa with an iodinating agent such as an alkali metal iodide, e.g., sodium, potassium or lithium iodide in an oxygenated hydrocarbon solution, e.g., an alkanone solution such as acetone. A molar excess of the iodide (3 to 20 moles of iodide per mole of steroid) is generally preferred. Thus, reaction of 9α-methyl-11β,17α,21-trihydroxy-4-pregnene-3,20-dione 21-methanesulfonate (XXIVa) or its 1-dehydro analogue with sodium iodide is productive of 9α-methyl-21-iodo-11β,17α-dihydroxy-4-pregnene-3,20-dione (XXIVb) or its 1-dehydro analogue.

The compounds of Formula XXIVb, i.e., 9α-methyl-21-iodo-11β,17α-dihydroxy-4-pregnene-3,20-dione or its 1-dehydro analogue, are dehalogenated at the 21-position by reaction with a reducing agent such as sodium or potassium thiosulfate, bisulfite or sulfite, or zinc and acetic acid or the like, to yield the compounds of Formula XXIVc, i.e., 9α-methyl-11β,17α-dihydroxy-4-pregnene-3,20-dione or the 1-dehydro analogue thereof. The compounds represented by Formula XXIVc are readily converted to the corresponding 11-keto steroids of Formula XXIVd by oxidation with chromium trioxide in glacial acetic acid or by means of other oxidizing agents.

The foregoing procedures can likewise be carried out on the 11-keto analogues corresponding to each of the starting steroids utilized to produce the compounds of Formulae XXIVa, XXIVb and XXIVc. Thus, 9α-methyl-17α,21-dihydroxy-4-pregnene-3,11,20-trione (XXIII—11=O, 21—OH) or its 1-dehydro analog can be converted by means of reaction with methanesulfonyl chloride to their 21-methanesulfonates, which in turn can be iodinated to form 9α-methyl-21-iodo-17α-hydroxy-4-pregnene-3,11,20-trione or its 1-dehydro analogue and the said 21-iodo compounds dehalogenated with a reducing agent such as sodium thiosulfate to give 9α-methyl-11-keto-17α-hydroxy-4-pregnene-3,11,20-trione or the corresponding 1-dehydro analogue.

The following preparations and examples are illustrative of the process and products of this invention, but are not to be construed as limiting.

PREPARATION 1

*9α-bromo-4-pregnene-3,11,20-trione (9α-1-bromo-11-keto-progesterone) (I)*

8.9 g. of the known compound, 9α-bromo-11β-hydroxy-4-pregnene-3,20-dione (9α-bromo-11β-hydroxyprogesterone), was dissolved in 50 ml. of glacial acetic acid by warming slightly. The steroid solution was cooled to room temperature, then 7.0 g. of sodium dichromate was added thereto and the resulting reaction mixture stirred for 1 hour. The reaction mixture was diluted with 400 ml. of water causing the product to precipitate. The product was filtered, dried over-night on a filter plate and yielded 7.2 g. of a white powder with a melting point of 146 to 158° C. A sample of this material was recrystallized from methanol to yield crystalline 9α-bromo-4-pregnene-3,11,20-trione (1) melting at 160 to 165° C.

PREPARATION 2

*4,8(9)-pregnadiene-3,11,20-trione [8(9)-dehydro-11-ketoprogesterone] (II)*

10.1 g. of 9α-bromo-4-pregnene-3,11,20-trione (I) was added to 40 ml. of collidine under an atmosphere of nitrogene. This mixture was heated to reflux to bring about complete solution. At the start of refluxing, collidine hydrobromide started to separate. Refluxing was continued for 15 minutes, then the reaction mixture was cooled to room temperature. The mixture was diluted with 400 ml. of ice and 200 ml. of concentrated hydrochloric acid. The partially crystalline product was removed by filtration, dissolved in 300 ml. of methylene chloride and chromatographed over a column of 500 g. of Florisil (synthetic magnesium silicate). Elution was with fractions containing mixtures of acetone (10% and 20%) in Skellysolve B (hexane hydrocarbons). 5.9 g. of bright yellow crystalline product was eluted in the fractions containing 20% of acetone. This material was purified from methanol to yield yellow crystals of 4,8(9)-pregnadiene-3,11,20-trione (II) with a melting point of 179 to 190° C.

The compound showed an ultraviolet absorption of λ max. 239 millimicrons, $a_M$=19,000 and an infrared absorption consistent with its structure.

EXAMPLE 1

*5,8(9)-pregnadiene-3,11,20-trione 3,20-bis(ethylene ketal) (III)*

A mixture of 10.0 g. of 4,8(9)-pregnadiene-3,11,20-trione (II), 200 ml. of benzene, 20 ml. of ethylene glycol and 0.25 g. of p-toluenesulfonic acid was refluxed under a water take-off head until the reaction had gone to completion. The reaction mixture was then cooled in an ice bath and 50 ml. of saturated sodium bicarbonate solution was added thereto with stirring. Layer separation, into an organic and an aqueous layer, occurred and the thus-obtained aqueous layer was extracted with methylene chloride and the extract was combined with the organic layer originally present. The combined organic layers were washed with water followed by removal of the solvent in vacuo. The residue thus obtained was dissolved in 300 ml. of methylene chloride and chromatographed over a column containing 300 g. of Florisil. The column was eluted with Skellysolve B (hexanes) containing increasing proportions of acetone. The 5% acetone in Skellysolve B hexanes eluate fraction, upon evaporation of the solvent, yielded 9.1 g. of material. Recrystallization of 2.1 g. of the thus-obtained material from aqueous methanol containing a drop of pyridine yielded 1.7 g. of crystalline 5,8(9)-pregnadiene-3,11,20-trione 3,20-bis(ethylene ketal) (III) melting at 130–132° C. and having the following analysis:

*Analysis.*—Calcd. for $C_{25}H_{34}O_5$: C, 72.43; H, 8.27. Found: C, 72.36; H, 8.34.

The ultraviolet absorption displayed a maximum at 241 millimicrons, $a_M$=4,460 and a shoulder at 265 millimicrons, $a_M$=3,420. Infrared absorption was consistent with the structure.

Similarly, 4,8(9)-pregnadiene-3,11,20-trione is reacted with other 1,2-alkane diols or 1,3-alkane diols to produce the corresponding crystalline 3,20-bis(alkylene ketals) of 5,8(9)-pregnadiene-3,11,20-trione.

EXAMPLE 2

*9α-methyl-5,7-pregnadiene-3,11,20-trione 3,20-bis(ethylene ketal) (IV) and 7α-methyl-5,8(9)-pregnadiene-3,11,20-trione 3,20-bis(ethylene ketal) (V)*

A solution of 1.399 g. of 5,8(9)-pregnadiene-3,11,20-trione 3,20-bis(ethylene ketal) (III) in 20 ml. of tertiary butyl alcohol was treated with 3.6 ml. of 1.1 N potassium tertiary butoxide and the reaction mixture thus obtained was cooled in a Dry Ice-acetone bath. The reaction vessel was evacuated and a mixture of 0.72 ml. of methyl iodide and 0.185 g. of $C^{14}$ methyl iodide which had previously been distilled into a trap was admitted by distillation. The reaction vessel was warmed to room temperature in a water bath and the reaction mixture stirred for 2.5 hours. At this time the reaction mixture was essentially neutral. 20 ml. of water was added to dissolve the potassium iodide which had precipitated and the tertiary butyl alcohol was then removed by distillation in vacuo. The product thus obtained was then extracted twice with methylene chloride followed by the removal of the solvent in vacuo. The residue thus obtained was redissolved in methylene chloride and chromatographed over a column containing 150 g. of Florisil. The column was then eluted with 100-ml. portions of solvents as shown by the following table (Table I).

TABLE I

| Fraction | Eluate | Net Wt. (mg.) |
|---|---|---|
| 1 | Methylene chloride | 17. |
| 2 | 3% Acetone-Skellysolve B | 1. |
| 3 | do | 4. |
| 4 | do | 24. |
| 5 | do | 131. |
| 6 | do | 236. |
| 7 | do | 199. 0.685 g. |
| 8 | do | 119. |
| 9 | do | 80. |
| 10 | do | 62. |
| 11 | do | 61. |
| 12 | 10% Acetone-Skellysolve B | 285. 0.351 g. |
| 13 | do | 66. |
| 14 | do | 16. |
| 15 | do | 9. |
| 16 | do | 7. |
| 17 | do | 10. |
| 18 | do | 14. |
| 19 | do | 17. |
| 20 | do | 16. |
| 21 | Acetone | 87. |
| 22 | do | 13. |

Fractions 5 through 8 were combined and weighed 0.685 g. Recrystallization from methanol yielded 0.446 g. of 9α-methyl-5,7-pregnadiene-3,11,20-trione 3,20-bis(ethylene ketal) (IV) having an ultraviolet absorption of λ max. 272 millimicrons, $a_M$ 8,675, and λ max. 281.5 millimicrons, $a_M$ 8,300.

The solvent was evaporated from fractions 12 and 13 and the residues were combined to give 0.351 g. of material. Recrystallization from methanol yielded 0.129 g. of 7α-methyl-5,8(9)-pregnadiene-3,11,20-trione 3,20-bis(ethylene ketal) (V), having an ultraviolet absorption of λ max. 254 millimicrons, $a_M$ 5,800, and a mother liquor which upon evaporation yielded 0.199 g. of a mixture of 7α-methyl-5,8(9)-pregnadiene-3,11,20-trione 3,20-bis(ethylene ketal) (V) and 7β-methyl-5,8(9)-pregnadiene-3,11,20-trione 3,20-bis(ethylene ketal) (Vβ).

Similarly, substituting other 5,8(9)-pregnadiene-3,11,20-trione 3,20-bis(alkylene ketals) for 5,8(9)-pregnadiene-3,11,20-trione 3,20-bis(ethylene ketal) there are obtained the corresponding crystalline 9α-methyl-5,7-pregnadiene-3,11,20-trione 3,20-bis(alkylene ketals) and 7α-methyl and 7β-methyl-5,8(9)-pregnadiene-3,11,20-trione 3,20-bis(alkylene ketals).

EXAMPLE 3

*9α-methyl-4,7-pregnadiene-3,11,20-trione (VI)*

A solution of 9α-methyl-5,7-pregnadiene-3,11,20-trione-3,20-bis(ethylene ketal) (IV) in ethanol was reacted with concentrated sulfuric acid and water added. The solution was then treated successively with sodium bicarbonate solution, acetic acid and water and extracted with methylene chloride. The solvent was evaporated from the extract and the oil isolated then chromatographed over a column of Florisil. The column was eluted with mixtures of acetone-Skellysolve B to yield 9α-methyl-4,7-pregnadiene-3,11,20-trione (VI).

Similarly, substituting another 9α-methyl-5,7-pregnadiene-3,11,20-trione 3,20-bis(alkylene ketal) as the starting steroid instead of 9α-methyl-5,7-pregnadiene-3,11,20-trione 3,20-bis(ethylene ketal) is also productive of 9α-methyl-5,7-pregnadiene-3,11,20-trione.

EXAMPLE 4

*9α-methyl-5,7-pregnadiene-11β-hydroxy-3,20-dione 3,20-bis(ethylene ketal) (VII)*

To a solution of 9α-methyl-5,7-pregnadiene-3,11,20-trione 3,20-bis(ethylene ketal) (IV) in anhydrous ether was added lithium aluminum hydride (amounting to approximately twice the weight of steroid) in benzene and the mixture stirred until completion of the reaction. Water was added slowly until the solvent phase separated. The aqueous phase was extracted with ethyl acetate and the extracts added to the solvent phase. The combined ether-ethyl acetate solution was washed with water, dried and evaporated to dryness under reduced pressure. The crude solid residue was crystallized from acetone-Skellysolve B to give 9α-methyl-5,7-pregnadiene-11β-hydroxy-3,20-dione 3,20-bis(ethylene ketal) (VII).

Similarly, substituting another 9α-methyl-5,7-pregnadiene-3,11,20-trione 3,20-bis(alkylene ketal) as the starting steroid instead of 9α-methyl-5,7-pregnadiene-3,11,20-trione 3,20-bis(ethylene ketal) is productive of the corresponding 9α-methyl-5,7-pregnadiene-11β-hydroxy-3,20-dione 3,20-bis(alkylene ketal).

EXAMPLE 5

9α-methyl-4,7-pregnadiene-11β-hydroxy-3,20-dione (VIII)

A solution of 9α-methyl-5,7-pregnadiene-11β-hydroxy-3,20-dione 3,20-bis(ethylene ketal) (VII) in ethanol was reacted with concentrated sulfuric acid and water added. The solution was then treated successively with sodium bicarbonate solution, acetic acid and water and extracted with methylene chloride. The solvent was evaporated from the extract and the oil isolated then chromatographed over a column of Florisil. The column was eluted with mixtures of acetone-Skellysolve B to yield 9α - methyl - 4,7 - pregnadiene - 11β - hydroxy - 3,20 - dione (VIII).

Similarly, substituting another 9α-methyl-5,7-pregnadiene-11β-hydroxy-3,20-dione 3,20-bis(alkylene ketal) as the starting steroid instead of 9α-methyl-5,7-pregnadien-11β-hydroxy-3,20-dione 3,20-bis(ethylene ketal) is also productive of 9α - methyl-4,7-pregnadiene-11β-hydroxy-3,20-dione.

EXAMPLE 6

9α-methyl-5,6-oxido-7-pregnene-3,11,20 - trione 3,20-bis-(ethylene ketal) (IX)

(a) 2.6 g. of sodium acetate and 26 ml. of 40% peracetic acid were placed in a 500 ml. round-bottomed flask fitted with a stirrer, thermometer and dropping funnel. The flask was cooled in an ice-salt bath until its contents was 0 to 5° C. A solution of 10.4 g. of 9α-methyl - 5,7-pregnadiene-3,11,20-trione 3,20-bis(ethylene ketal) (IV) in 260 ml. of methylene chloride was added dropwise to the flask over a period of about 20 minutes while the temperature of the reaction mixture remained at 5 to 10° C. The contents of the flask was stirred for a period of 3 hours during which time the ice was allowed to melt and the temperature inside the flask rose to about 20° C. At the end of the 3-hour stirring period the mixture was transferred to a separatory funnel and the lower methylene chloride layer removed from a small layer of excess peracetic acid. The methylene chloride layer was washed with saturated sodium bicarbonate solution, dried over anhydrous sodium sulfate and concentrated to dryness by vacuum distillation. The residue, a gummy mass, was suspended in 40 ml. of methanol and 6 drops of pyridine added to stabilize the ketal groups. The methanol suspension was brought to boiling on the steam bath to dissolve the gummy and partially crystalline material and then placed in a refrigerator at 5° C. for a period of 2 hours. The product was then collected by filtration and dried in vacuo at 40° C. to constant weight to yield 7.42 g. (68.8% of theoretical) of 9α-methyl-5,6-oxido-7-pregnene-3,11,20-trione 3,20-bis(ethylene ketal) (IX) with a melting point of 157 to 159° C. and having the following analysis:

Calcd. for $C_{26}H_{36}O_6$: C, 70.24; H, 8.16. Found: C, 70.11; H, 8.20.

(b) (Alternative method): A solution of 2.48 g. of 9α-methyl-5,7-pregnadiene-3,11,20-trione 3,20-bis(ethylene ketal) (IV) in 50 ml. of benzene was cooled in an ice bath until freezing began. A solution of perbenzoic acid in benzene (18.8 ml., titrating 45.5 mg. perbenzoic acid per milliliter) was added to the benzene solution of the ketal and the resulting mixture allowed to stand for a period of 3 days in a refrigerator. 25 ml. of 5% aqueous sodium carbonate was added and the mixture stirred for a period of 15 minutes. The solvent layer separated and the aqueous layer was extracted several times with methylene chloride. The combined solvent layers were dried and the solvent removed in vacuo. The crystalline residue was recrystallized from methanol and yielded pure 9α-methyl-5,6-oxido-7-pregnene-3,11,20-trione 3,20-bis(ethylene ketal) (IX) melting at 157 to 162° C.

Similarly, substituting another 9α-methyl-5,7-pregnadiene-3,11,20-trione 3,20-bis(alkylene ketal) as the starting steroid instead of 9α-methyl-5,7-pregnadiene-3,11,20-trione 3,20-bis(ethylene ketal) in (a) and (b) above is productive of the corresponding 9α-methyl-5,6-oxido-7-pregnene-3,11,20-trione 3,20-bis(alkylene ketal).

EXAMPLE 6A

9α-methyl-5α,8α-dihydroxy-6-pregnene-3,11,20-trione 3,20-bis(ethylene ketal) (XIV)

0.5 g. of sodium acetate and 5 ml. of 40% peracetic acid were put in a 100 ml. round-bottomed flask fitted with a stirrer, thermometer and dropping funnel. The flask was cooled in an ice bath until its contents was 0 to 5° C. A solution of 2.0 g. of 9α-methyl-5,7-pregnadiene-3,11,20-trione 3,20-bis(ethylene ketal) (IV) in 55 ml. of methylene chloride was added dropwise to the flask over a period of about 20 minutes while the temperature of the reaction mixture was allowed to reach 22 to 25° C. The contents of the flask was stirred for for a period of 4.5 hours, then transferred to a separatory funnel and the lower methylene chloride layer removed from a small layer of excess peracetic acid. The methylene chloride layer was washed with saturated sodium bicarbonate solution, dried over anhydrous sodium sulfate and concentrated to dryness by vacuum distillation. The gummy residue was suspended in 10 ml. of methanol and several drops of pyridine added to stabilize the ketal groups. The methanol suspension was brought to boiling on the steam bath to dissolve the gummy and partially crystalline material and then refrigerated at 5° C. for a period of about 2 hours. The product was then filtered by suction and dried in vacuo at 40° C. to constant weight to yield 1.64 g. (79% of theoretical) of 9α - methyl - 5α,8α - dihydroxy - 6 - pregnene - 3,11,20 - trione 3,20-bis(ethylene ketal) (XIV) with a melting point of 230 to 235° C. and having the following analysis:

Calcd. for $C_{26}H_{40}O_7$: C, 67.7; H, 8.29. Found: C, 67.69; H, 8.24.

EXAMPLE 6B

9α-methyl-5α,8α-dihydroxy-6-pregnene-3,11,20-trione (XV)

2.67 g. of 9α-methyl-5α,8α-dihydroxy-6-pregnene-3,11,20-trione 3,20-bis(ethylene ketal) (XIV) was dissolved in 200 ml. of acetone and 5 ml. of 2% hydrochloric acid added. This mixture was allowed to stand in the refrigerator at 5 to 8° C. for a period of about 48 hours. The excess acid was neutralized with sodium bicarbonate and the acetone evaporated, leaving a residue that was then partitioned between methylene chloride and water. The organic phase was dried over anhydrous sodium sulfate and then chromatographed over 200 g. of Florisil. The product was contained in a peak of three fractions obtained by elution with 200 ml. portions of a mixture consisting of 25% acetone plus 75% Skellysolve B. Purification of this material from ether solution gave 610 mg. of light colored crystalline 9α-methyl-5α,8α-dihydroxy-6-pregnene-3,11,20-trione (XV) with a melting point of 188 to 190° C. and rotation $[\alpha]_D$ of +13° (chloroform).

Analysis.—Calcd. for $C_{22}H_{30}O_5$: C, 70.6; H, 8.14. Found: C, 70.31; H, 8.14.

EXAMPLE 7

9α-methyl-5-hydroxy-6-acetoxy-7-pregnene-3,11,20-trione 3,20-bis(ethylene ketal) (X)

A solution of 0.58 g. of 9α-methyl-5,6-oxido-7-pregnene-3,11,20-trione 3,20-bis(ethylene ketal) (IX) in 5 ml. of acetic anhydride was cooled to the temperature of Dry Ice-acetone. Four drops of boron trifluoride etherate was added and the mixture allowed to stand at Dry Ice temperature for a period of 2.5 hours. This mixture was poured into 70 ml. of an ice cold 10% sodium hydroxide solution, stirred for a period of 30 minutes and then extracted with methylene chloride. The product crystallized upon removal of the solvent. Recrystallization from methanol yielded crystalline 9α-methyl - 5 - hydroxy-6-acetoxy-7-pregnene-3,11,20-trione 3,20-bis(ethylene ketal) (X) melting at 179 to 183° C.

*Analysis.*—Calcd. for $C_{28}H_4O_8$: C, 66.64; H, 7.99. Found: C, 66.81; H, 8.19.

The infrared spectrum showed hydroxyl, acetate, ketone and C=C absorption.

Similarly, substituting another 9α-methyl-5,6-oxido-7-pregnene-3,11,20-trione 3,20-bis(alkylene ketal) as the starting steroid instead of 9α-methyl-5,6-oxido-7-pregnene-3,11,20-trione 3,20-bis(ethylene ketal) is productive of the corresponding 9α-methyl-5-hydroxy-6-acetoxy-7-pregnene-3,11,20-trione 3,20-bis(alkylene ketal).

EXAMPLE 8

*9α-methyl-5-hydroxy-7-pregnene-3,6,11,20-tetrone 3,20-bis(ethylene ketal)* (XII)

The 9α-methyl-5-hydroxy-6-acetoxy-7-pregnene-3,11,20-trione 3,20-bis(ethylene ketal) (X) obtained in Example 7 was dissolved in 15 ml. of methanol under nitrogen and one pellet of sodium hydroxide added. After stirring for a period of 2 hours, 40 ml. of water was added and the product extracted with methylene chloride. The methylene chloride extract was evaporated to give an oil. Infrared spectra of solutions of the oil showed it to have hydroxyl, ketone and C=C absorption and a structure consistent with that of 9α-methyl-5,6-dihydroxy-7-pregnene-3,11,20-trione 3,20-bis(ethylene ketal) (XI). The oil was dissolved in 25 ml. of ethyl acetate and 2 g. of activated manganese dioxide added and the mixture shaken on a wrist-action shaker for a period of 5 hours. The reaction mixture was filtered through Celite (diatomaceous earth) and the solvent removed by evaporation to yield 0.346 g. of a crystalline residue. Recrystallization gave pure 9α-methyl-5-hydroxy-7-pregnene-3,6,11,20-tetrone 3,20-bis(ethylene ketal) (XII) with a melting point of 205 to 206.5° C.

*Analysis.*—Calcd. for $C_{26}H_{36}O_7$: C, 67.80; H, 7.88. Found: C, 67.96; H, 7.87.

Infrared absorption indicated the presence of OH, C=O, and conjugated C=O. The ultraviolet spectrum gave $\lambda_{EtOH}^{max}$ 255 mμ, $a_M$ 9,525

Similarly, substituting another 9α-methyl-5-hydroxy-6-acetoxy - 7 - pregnene - 3,11,20 - trione 3,20-bis(alkylene ketal) as the starting steroid instead of 9α-methyl-5-hydroxy-6-acetoxy-7-pregnene-3,11,20-trione 3,20-bis(ethylene ketal) is productive of the corresponding 9α-methyl-5-hydroxy-7-pregnene-3,6,11,20-tetrone 3,20-bis(alkylene ketal).

EXAMPLE 9

*9α-methyl-5,6,11-trihydroxy-7-pregnene-3,20-dione 3,20-bis(ethylene ketal)* (XVI)

A suspension of 1.8 g. of 9α-methyl-5,6-dihydroxy-7-pregnene-3,11,20-trione 3,20-bis(ethylene ketal) (XI) in 25 ml. of benzene was added dropwise to a solution of 1 g. of lithium aluminum hydride in 100 ml. of absolute ether. After stirring for a period of 2 hours at room temperature the excess lithium aluminum hydride was decomposed by the addition of 2 ml. of ethyl acetate and 2 ml. of water. The reaction mixture was filtered and the inorganic salts washed with methylene chloride. The filtrate was allowed to evaporate and gave a partially crystalline residue. The residue was recrystallized from methanol to yield 0.61 g. of 9α-methyl-5,6,11-trihydroxy-7-pregnene-3,20-dione 3,20-bis(ethylene ketal) (XVI) melting at 240 to 242° C.

The infrared spectrum showed OH at 3520, 3440 cm.$^{-1}$ and C=C at 1656 cm.$^{-1}$.

Similarly, substituting another 9α-methyl-5,6-dihydroxy-7-pregnene-3,11,20-trione 3,20-bis(alkylene ketal) as the starting steroid instead of 9α-methyl-5,6-dihydroxy-7-pregnene-3,11,20-trione 3,20-bis(ethylene ketal) is productive of the corresponding 9α-methyl-5,6,11-trihydroxy-7-pregnene-3,20-dione 3,20-bis(alkylene ketal).

EXAMPLE 10

*9α-methyl-5,6,11-trihydroxy-7-pregnene-3,20-dione 3,20-bis(ethylene ketal)* (XVI)

A solution of 1.36 g. of 9α-methyl-5-hydroxy-6-acetoxy-7-pregnene-3,11,20-trione 3,20-bis(ethylene ketal) (X) in 35 ml. of benzene was added dropwise with stirring to a solution of 0.7 g. of lithium aluminum hydride in 75 ml. of absolute ether. After stirring for a period of 1.5 hours the reaction mixture was refluxed for 30 minutes. The reaction mixture was cooled and the excess lithium aluminum hydride decomposed by the addition of 3 ml. of ethyl acetate and 3 ml. of water. The mixture was filtered to remove the inorganic salts and the solvent removed in vacuo. The residue was recrystallized from methanol in three crops to yield 9α-methyl-5,6,11-trihydroxy-7-pregnene-3,20-dione 3,20-bis(ethylene ketal) (XVI). The first crop contained 0.27 g. and melted at 241 to 243° C.; the second crop weighed 0.11 g. and had a melting point of 227 to 235° C. and the third yielded 0.33 g. and melted at 237 to 244° C. The infrared absorption spectra of these crops were identical to that of the compound prepared in Example 9.

*Analysis (first crop).*—Calcd. $C_{26}H_{40}O_7$: C, 67.21; H, 8.68. Found: C, 67.70; H, 8.46.

The infrared spectrum showed OH (free) at 3450 cm.$^{-1}$; OH (bonded) at 2660, 2320 cm.$^{-1}$; C=O at 1695, 1672 cm.$^{-1}$. A fourth crop of crystals weighing 0.25 g. with a melting point of 195 to 199° C. was also recovered.

Similarly, substituting another 9α-methyl-5-hydroxy-6-acetoxy-7-pregnene-3,11,20-trione 3,20-bis(alkylene ketal) as the starting steroid instead of 9α-methyl-5-hydroxy-6-acetoxy-7-pregnene-3,11,20-trione 3,20-bis(ethylene ketal) is productive of the corresponding 9α-methyl-5,6,11-trihydroxy-7-pregnene-3,20-dione 3,20-bis(alkylene ketal).

EXAMPLE 11

*9α-methyl-5,11-dihydroxy-7-pregnene-3,6,20-trione 3,20-bis(ethylene ketal)* (XVII)

A solution of 0.54 g. of 9α-methyl-5,6,11-trihydroxy-7-pregnene-3,20-dione 3,20-bis(ethylene ketal) (XVI) in 25 ml. of ethyl acetate and 10 ml. of dioxane was prepared by warming on a steam bath. The solution was cooled slightly, 2.5 g. of activated manganese dioxide added and the mixture mechanically shaken for a period of 5 hours. The mixture was filtered through Celite and the solvent removed in vacuo to yield 0.46 g. of a crystalline product. Recrystallization from methanol gave 9α-methyl-5,11-dihydroxy-7-pregnene-3,6,20-trione 3,20-bis(ethylene ketal) (XVII) melting at 270 to 272° C.

*Analysis.*—Calcd. for $C_{26}H_{38}O_7$: C, 67.51; H, 8.58. Found: C, 67.04; H, 8.23.

Infrared analysis showed absorption at 3460 cm.$^{-1}$ (OH), 1690 cm.$^{-1}$ (C=O) and 1630 cm.$^{-1}$ (C=C). The ultraviolet spectrum gave λ max. 243 millimicrons, $a_M$ 10,725.

Similarly, substituting another 9α-methyl-5,6,11-trihydroxy-7-pregnene-3,20-dione 3,20-bis(alkylene ketal) as the starting steroid instead of 9α-methyl-5,6,11-trihydroxy-7-pregnene-3,20-dione 3,20-bis(ethylene ketal) is productive of the corresponding 9α-methyl-5,11-dihydroxy-7-pregnene-3,6,20-trione 3,20-bis(alkylene ketal).

EXAMPLE 12

*9α-methyl-5,11-dihydroxy-7-pregnene-3,6,20-trione 3,20-bis(ethylene ketal)* (XVII)

A solution of 1.35 g. of 9α-methyl-5-hydroxy-7-pregnene-3,6,11,20-tetrone 3,20-bis(ethylene ketal) (XII) in 25 ml. of benzene was added dropwise to a suspension of 0.75 g. of lithium aluminum hydride in 75 ml. of absolute ether. The reaction mixture was stirred at room temperature for a period of 1 hour and then heated under reflux for 30 minutes. The excess lithium aluminum hydride was decomposed by the addition of 3 ml. of ethyl acetate and then 3 ml. of water, after which the mixture was filtered and the solvent from the filtrate removed in vacuo. The residue weighed 1.43 g. and was dissolved in 30 ml. of dioxane and 30 ml. of benzene. This solution was shaken with 6 g. of activated manganese dioxide for a period of about 16 hours, filtered through Celite, the solvent removed in vacuo leaving 1.17 g. of a crystalline residue of 9α-methyl-5,11-dihydroxy-7-pregnene-3,6,20-trione 3,20-bis(ethylene ketal) (XVII).

The ultraviolet spectrum gave λ max. 250 millimicrons and infrared analysis of a solution of the product yielded a spectrum identical with that obtained in Example 11.

Similarly, substituting another 9α-methyl-5-hydroxy-7-pregnene-3,6,11,20-tetrone 3,20-bis(alkylene ketal) as the starting steroid instead of 9α-methyl-5-hydroxy-7-pregnene-3,6,11,20-tetrone 3,20-bis(ethylene ketal) is productive of the corresponding 9α-methyl-5,11-dihydroxy-7-pregnene-3,6,20-trione 3,20-bis(alkylene ketal).

EXAMPLE 13

*9α-methyl-5α,11β-dihydroxypregnane-3,6,20-trione 3,20-bis(ethylene ketal)* (XVIII)

A solution of 1.67 g. of 9α-methyl-5α,11β-dihydroxy-7-pregnene-3,6,20-trione 3,20-bis(ethylene ketal) (XVII) in 36 ml. of dioxane was added dropwise to a solution of 0.7 g. of lithium in 140 ml. of liquid ammonia. The reaction mixture, contained in a flask adequately protected from atmospheric moisture and insulated in a bed of Celite, was stirred for 30 minutes following the addition of steroid. The excess lithium-ammonia complex was decomposed by the cautious addition of solid ammonium chloride indicated by a color change from blue to grayish white in the reaction mixture. The ammonia was allowed to evaporated from the reaction mixture and the residue taken up in 30 ml. of water. The steroid was extracted with three 25 ml. portions of methylene chloride. The extract was dried over anhydrous sodium sulfate and then poured on a column of 75 g. of Florisil for purification of the product. The product was eluted from the column with 100 ml. portions of 10% acetone in Skellysolve B. Fractions 4 to 9, inclusive, yielded 460 mg. of 9α-methyl-5α,11β-dihydroxypregnane-3,6,20-trione 3,20-bis(ethylene ketal) (XVIII) melting at 228 to 232° C.

Infrared spectra showed absorption for the 5 and 11-hydroxy groups at 3450 cm.$^{-1}$ and 3600 cm.$^{-1}$, the non-conjugated ketone at the 6-position at 1720 cm.$^{-1}$ and carbon-oxygen single bonding for the 3,20-bis(ethylene ketals) at 1055 cm.$^{-1}$. The absence of carbon-carbon double bonding present in the starting material was noted.

Similarly, substituting another 9α-methyl-5α,11β-dihydroxy-7-pregnene-3,6,20-trione 3,20-bis(alkylene ketal) as the starting steroid instead of 9α-methyl-5α,11β-dihydroxy-7-pregnene-3,6,20-trione 3,20-bis(ethylene ketal) is productive of the corresponding 9α-methyl-5α,11β-dihydroxypregnane-3,6,20-trione 3,20-bis(alkylene ketal).

EXAMPLE 14

*9α-methyl-5-hydroxypregnane-3,6,11,20-tetrone 3,20-bis(ethylene ketal)* (XIII)

400 mg. of 9α-methyl-5α,11β-dihydroxypregnane-3,6,20-trione 3,20-bis(ethylene ketal) (XVIII) was dissolved in 35 ml. of pyridine, 150 mg. of chromic acid was added and the mixture stirred until the latter dissolved. The reaction mixture was permitted to stand at room temperature for a period of about 16 hours and then poured into 150 ml. of ice and water. The steroid was extracted three times with 30 ml. volumes of methylene chloride and the pooled extracts dried over anhydrous sodium sulfate. The dried extract was poured onto a column containing 50 g. of Florisil for chromatography. The product was eluted with 100 ml. portions of 7.5% acetone in Skellysolve B to yield 275 mg. in fractions 6 to 11, inclusive. After recrystallization from methanol, 150 mg. of 9α-methyl-5-hydroxypregnane-3,6,11,20-tetrone 3,20-bis(ethylene ketal) (XIII) with a melting point of 202 to 206° C. was obtained.

*Analysis.*—Calcd. for $C_{26}H_{38}O_7$: C, 67.50; H, 8.29. Found: C, 67.39; H, 8.48.

Similarly, substituting another 9α-methyl-5α,11β-dihydroxypregnane-3,6,20-trione 3,20-bis(alkylene ketal) as the starting steroid instead of 9α-methyl-5α,11β-dihydroxypregnane-3,6,20-trione 3,20-bis(ethylene ketal) is productive of the corresponding 9α-methyl-5-hydroxypregnane-3,6,11,20-tetrone 3,20-bis(alkylene ketal).

EXAMPLE 15

*9α-methyl-4-pregnene-3,11,20-trione (9α-methyl-11-ketoprogesterone)* (XX)

0.462 g. of 9α-methyl-5-hydroxypregnane-3,6,11,20-tetrone 3,20-bis(ethylene ketal) (XIII) was dissolved in 10 ml. of ethylene glycol and 5 ml. of absolute ethanol by warming the mixture to about 100° C. The solution was cooled to room temperature and 15 ml. of 98% hydrazine hydrate and 1 g. of potassium hydroxide pellets added. The reaction mixture was stirred and refluxed for 30 minutes and the reflux condenser then removed and part of the solvent allowed to distill. The reaction mixture was kept at a temperature of 180° to 200° C. for a period of about 2 hours, then poured into 50 ml. of water and the solution saturated with sodium chloride. The product, 9α-methyl-5-pregnene-3,11,20-trione 3,20-bis-(ethylene ketal) (XIX) was extracted three times with 20 ml. volumes of methylene chloride and dried over anhydrous sodium sulfate. The extract was chromatographed over a column containing 200 g. of Florisil. The product was eluted with 100 ml. portions of 5% acetone in Skellysolve B. Fractions 5 to 7, inclusive, gave 0.270 g. which was dissolved in 15 ml. of acetone. To this was added 1 ml. of water, then 0.5 ml. of 2% hydrochloric acid and the resulting solution allowed to stand at room temperature for a period of about 24 hours. The solution was neutralized by the addition of 2% sodium bicarbonate and the acetone removed by distillation in vacuo. The residue was extracted three times with 5 ml. volumes of methylene chloride and evaporation of the solvent gave a white semicrystalline solid. Recrystallization of the product from a mixture of ether and Skellysolve B yielded 0.180 g. of 9α-methyl-4-pregnene-3,11,20-trione (9α-methyl-11-ketoprogesterone) (XX) with a melting point of 128 to 134° C.

9α-methyl-11-ketoprogesterone possesses valuable anti-inflammatory, anti-anabolic, anti-tumor, pituitary inhibiting and salt and water regulating activity of improved therapeutic ratio.

Similarly, substituting another 9α-methyl-3,6,11,20-tetrone 3,20-bis(alkylene ketal) as the starting steroid instead of 9α-methyl-3,6,11,20-tetrone 3,20-bis(ethylene ketal) is also productive of 9α-methyl-4-pregnene-3,11,20-trione.

EXAMPLE 16

*Methyl 9α-methyl-3,11-diketo-4,17(20)-pregnadien-21-oate* (XXI)

3.28 of 9α-methyl-4-pregnene-3,11,20-trione (XX) was dissolved in 50 ml. of dry tertiary-butyl alcohol by warming to about 70° C. with stirring in a 500 ml. flask fitted with a reflux condenser, stirrer, gas inlet tube and dropping funnel. The apparatus was protected from atmospheric moisture by drying tubes containing an effective desiccant. The reaction flask was flushed with nitrogen and a slow stream of the gas kept passing over the reaction mixture. The steroid solution was cooled to 55° C. and 5.42 ml. of ethyl oxalate added. After 1 minute of stirring, a 25% solution of sodium methoxide containing 1.34 g. as 100% is added and rinsed into the reaction flask with a small volume of methanol. The reaction mixture was stirred for 15 minutes and allowed to cool to about 35° C. A solution of 1.22 g. of anhydrous sodium acetate and 1.43 ml. of acetic acid in 80 ml. of methanol cooled to 10° C. was added to the reaction mixture. The reaction mixture was cooled in an ice bath to 0° C. and a solution (previously cooled to 5° C.) containing 5 g. of bromine in 4.8 ml. of methanol was added dropwise over a period of 15 minutes. 2.36 g. of sodium methoxide (as a 25% solution in methanol) was added to the reaction mixture, warmed to 25° C. and stirred for a period of about 3 hours. The reaction mixture was then treated with 8 ml. of acetic acid and 1.6 g. of zinc dust for a period of about 30 minutes. The unreacted zinc dust was filtered from the liquor and the latter poured into 800 ml. of ice and water with vigorous stirring. This mixture was allowed to stand for a period of about 1 hour at a temperature of from 0 to 5° C. after which the precipitated product was filtered by suction and washed on the filter with deionized water. The crude product was dried in vacuo at 55° C. to constant weight, taken up in 25 ml. of methylene chloride and chromatographed over 250 g. of Florisil. The product was eluted with 100 ml. portions of 10% acetone in Skellysolve B to give crystalline methyl 9α-methyl-3,11-diketo-4,17(20)-pregnadien-21-oate (XXI).

Other alkyl 9α-methyl-3,11-diketo-4,17(20)-pregnadien-21-oates are prepared by substituting the appropriate alkali metal alkoxides and alkanol for the sodium methoxide in methanol used in Example 16, e.g., sodium ethoxide in ethanol if the ethyl ester is desired, sodium propoxide in propanol to produce the propyl ester, and so on.

EXAMPLE 17

9α-methyl-11β,21-dihydroxy-4,17(20)-pregnadien-3-one 21-acetate (XXII)

2.0 g. of methyl 9α-methyl-3,11-diketo-4,17(20)-pregnadien-21-oate (XXI) was dissolved in 40 ml. of benzene in a reaction flask fitted with a water trap, reflux condenser and stirrer. 2 ml. of pyrrolidine and 600 mg. of paratoluenesulfonic acid monohydrate was added to the flask and the reaction mixture refluxed on a steam bath with continuous efficient stirring for a period of about one hour. The heating was discontinued, the apparatus adapted to vacuum distillation and benzene and excess pyrrolidine removed under reduced pressure with care being exercised to keep the flask temperature below 60° C. The crystalline enamine remaining in the flask was dissolved in 10 ml. of benzene by warming slightly and added to a previously prepared suspension of lithium aluminum hydride in 100 ml. of anhydrous ether. The reaction mixture was stirred for a period of about one hour at room temperature. The excess lithium aluminum hydride was destroyed by dropwise addition of 6 ml. of ethyl acetate followed by 10 ml. of deionized water. During these additions the ether is allowed to distill from the reaction mixture. The remaining ether was removed by distillation in vacuo and the residual slurry stirred for 5 minutes with 130 ml. of methanol. Treatment of this mixture with 25 ml. of 5% sodium hydroxide at a temperature of about 40° C. for a period of approximately 10 minutes removed the enamine group. The mixture was then made acidic by the addition of 7 ml. of acetic acid and most of the methanol removed by vacuum distillation, the necessary heat being furnished by a water bath maintained at about 50° C. When the volume of the residual slurry was reduced to about 30 ml., the distillation was stopped and the inorganic salts dissolved from the crystalline product by the addition of 10 ml. of concentrated hydrochloric acid in 50 ml. of water. The product was collected by filtration thoroughly washed with deionized water and the crystalline product dried to constant weight in vacuo at 50° C. The dried material was dissolved in 10 ml. of pyridine and treated with 3 ml. of acetic acid for a period of about 4 hours at room temperature. This reaction mixture was poured into 150 ml. of ice and water and allowed to stand for about one hour. The crystalline product, 9α - methyl-11β,21-dihydroxy-4,17(20)-pregnadien-3-one 21-acetate (XXII) was collected by filtration and dried to constant weight in vacuo at 40° C.

EXAMPLE 18

9α - methyl - 11β,17α,21 - trihydroxy - 4 - pregnene - 3,20-dione 21-acetate (9α-methylhydrocortisone 21-acetate) (XXIII)

0.84 g. (2 millimoles) of 9α-methyl-11β,21-dihydroxy-4,17(20)-pregnadiene-3-one 21-acetate (XXII) was dissolved by warming to a temperature of about 60° C. in 40 ml. of tertiary butyl alcohol and 0.5 ml. of pyridine. The solution was cooled to about 30° C. and 2.76 ml. of a solution of osmium tetroxide in tertiary-butyl alcohol (0.25 mg. per ml.) and 1.38 ml. (5.5 millimoles as hydrogen peroxide) of a solution of N-methylmorpholine oxide-hydrogen peroxide complex in tertiary-butyl alcohol added. The reaction mixture was stirred at room temperature for a period of about 16 hours. Reduced osmium was removed by treatment with 450 mg. of Magnesol (magnesium silicate) for about 1 hour. The Magnesol was separated by filtration and washed with a small amount of tertiary-butyl alcohol which was combined with the main filtrate. The pooled solutions were concentrated to a volume of about 15 ml. and treated with 15 ml. of sodium sulfite solution (containing 5 mg./ml.) for about 10 minutes. This mixture was cooled to about 5° C. and maintained at that temperature for a period of about 16 hours. The product was separated by filtration and recrystallized from ethyl acetate and Skellysolve B to give 9α-methylhydrocortisone 21-acetate (XXIII).

EXAMPLE 19

9α - methyl - 17α,21 - dihydroxy - 4 - pregnene - 3, 11,20-trione 21-acetate (9α-methylcortisone 21-acetate) (XXIII–11=O)

To a stirred solution of 9α-methyl-11β,17α,21-trihydroxy-4-pregnene-3,20-dione 21-acetate (XXIII) dissolved in glacial acetic acid and thereafter cooled to about 10 to 15° C., a solution of chromium trioxide dissolved in glacial acetic acid and a small amount of water was added dropwise over a period of about one-half hour. The temperature of the stirred solution was allowed to rise to about 18 to 20° C. over a period of approximately one hour. The excess chromium trioxide was destroyed by the addition of an aqueous sodium sulfite solution. The product was extracted from the reaction mixture with ether and purified by chromatographing over a column of Florisil to yield crystalline 9α-methyl-17α,21-dihydroxy-4-pregnene-3,11,20-trione 21-acetate (XXIII–11=O).

EXAMPLE 20

9α-methyl-11β,17α,21-trihydroxy-4-pregnene-3,20-dione (9α-methylhydrocortisone) (XXIII–21—OH)

Potassium carbonate was added to approximately twice its weight of 9α-methyl-11β,17α,21-trihydroxy-4-pregnene-3,20-dione 21-acetate (XXIII) dissolved in methanol containing a small volume of water and previously purged of air and oxygen by the passage of nitrogen through it. After standing at room temperature for a period of six to eight hours in a nitrogen atmosphere, the reaction mixture was neutralized with 5% aqueous hydrochloric acid solution, diluted with water and refrigerated. The mixture was filtered and the solids recrystallized from a mixture of acetone and Skellysolve B to give pure 9α- methyl - 11β,17α,21 - trihydroxy - 4 - pregnene - 3,20-dione (XXIII–21—OH).

EXAMPLE 21

*9α-methyl-17α,21-dihydroxy-4-pregnene-3,11,20-trione (9α-methylcortisone)* (XXIII–11=O, 21—OH)

In the manner given in Example 20, hydrolyzing 9α-methyl - 17α,21 - dihydroxy - 4 - pregnene - 3,11,20 - trione 21-acetate (XXIII–11=O) with potassium hydroxide in methanol yielded crystalline 9α-methyl-17α,21-dihydroxy - 4 - pregnene - 3,11,20 - trione (9α - methylcortisone) (XXIII–11=O, 21—OH).

EXAMPLE 22

*9α - methyl - 11β,17α,21 - trihydroxy - 4 - pregnene - 3,20-dione 21-acetate (9α-methylhydrocortisone 21-acetate)* (XXIII)

A mixture was prepared containing 9α-methylhydrocortisone (XXIII–21—OH) in pyridine and acetic anhydride. The mixture was maintained at room temperature (22 to 24° C.) for a period of about six hours, thereupon poured into ice water and the resulting aqueous mixture extracted with three portions of methylene chloride. The combined methylene chloride solutions were washed, dried over sodium sulfate and evaporated and the thus obtained residue recrystallized three times from acetone-Skellysolve B hexanes to give pure 9α-methylhydrocortisone 21-acetate (9α-methyl-11β,17α-dihydroxy-21-acetoxy-4-pregnene-3,20-dione).

EXAMPLE 23

*9α-methyl - 11β,17α,21 - trihydroxy - 4 - pregnene - 3, 20-dione 21-hemisuccinate (9α-methylhydrocortisone 21-hemisuccinate)* (XXIII)

To a stirred solution of succinic anhydride in pyridine was added 9α-methylhydrocortisone (XXIII–21—OH). Stirring was continued until the 9α-methylhydrocortisone was completely dissolved. After standing overnight the reaction mixture was slowly poured into a vigorously stirred mixture of concentrated hydrochloric acid, water and ice. Stirring was continued for about one hour and the crude crystalline 9α-methylhydrocortisone 21-hemisuccinate was separated by filtration. The product was washed on the filter with water until the filtrate had a pH of 4.0, dried and recrystallized from methyl ethyl ketone and Skellysolve B hexanes to give pure 9α-methylhydrocortisone 21-hemisuccinate (XXIII).

EXAMPLE 24

*9α - methyl - 11β,17α,21 - trihydroxy - 4 - pregnene - 3, 20-dione 21-acylates (9α-methylhydrocortisone 21-acylates)* (XXIII)

In the same manner as given in Example 22, treating in pyridine solution:

(a) 9α-methylhydrocortisone with propionic anhydride yielded 9α-methylhydrocortisone 21-propionate.

(b) 9α-methylhydrocortisone with butyric anhydride yielded 9α-methylhydrocortisone 21-butyrate.

(c) 9α-methylhydrocortisone with valeric anhydride yielded 9α-methylhydrocortisone 21-valerate.

(d) 9α-methylhydrocortisone with hexanoyl bromide yielded 9α-methylhydrocortisone 21-hexanoate.

(e) 9α-methylhydrocortisone with heptanoyl bromide yielded 9α-methylhydrocortisone 21-heptanoate.

(f) 9α-methylhydrocortisone with octanoyl chloride yielded 9α-methylhydrocortisone 21-octanoate.

(g) 9α-methylhydrocortisone with benzoyl chloride yielded 9α-methylhydrocortisone 21-benzoate.

(h) 9α-methylhydrocortisone with phenylacetyl chloride yielded 9α-methylhydrocortisone 21-phenylacetate.

(i) 9α-methylhydrocortisone with β-cyclopentylpropionyl bromide yielded 9α-methylhydrocortisone 21-(β-cyclopentylpropionate).

In a manner similar to Examples 22 and 23, other 9α-alkylhydrocortisone 21-acylates can be prepared by esterifying a 9α-alkylhydrocortisone in pyridine solution with the appropriate acyl halide or carboxylic acid anhydride.

EXAMPLE 25

*9α-methyl-17α-21-dihydroxy-4-pregnene-3,11,20-trione 21-acetate (9α-methylcortisone 21-acetate)* (XXIII–11=O, 21—Ac)

In the same manner as in Example 22, substitution of 9α-methylcortisone (XXIII–11=O, 21—OH) as the starting steroid is productive of 9α-methyl-17α,21-dihydroxy-4-pregnene-3,11,20-trione 21-acetate (XXIII–11=O, 21—Ac).

EXAMPLE 26

*9α-methyl-17α-21-dihydroxy-4-pregnene-3,11,20-trione 21-hemisuccinate (9α-methylcortisone 21-hemisuccinate)* (XXIII–11=O, 21—Ac)

In the same manner as in Example 23, substitution of 9α-methylcortisone (XXIII–11=O, 21—OH) as the starting steroid is productive of 9α-methyl-17α,21-dihydroxy-4 - pregnene - 3,11,20 - trione 21-hemisuccinate (XXIII–11=O, 21—Ac).

EXAMPLE 27

*9α-methyl-17α,21-dihydroxy-4-pregnene-3,11,20-trione 21-acylates (9α-methylcortisone 21-acylates)* (XXIII–11=O, 21—Ac)

In the same manner as in Example 24, substitution of 9α-methylcortisone (XXIII–11=O, 21—OH) as the starting steroid is productive of the 9α-methyl-17α, 21-dihydroxy-4-pregnene-3,11,20-trione 21-acylate corresponding to the 9α-methylhydrocortisone 21-acylate produced in (a) to (i).

EXAMPLE 28

*9α - methyl - 11β,17α - dihydroxy - 21-acetoxy-1,4-pregnadiene - 3,20-dione (9α-methyl-1-dehydrohydrocortisone 21-acetate) and 9α-methyl-11β,17α,21-trihydroxy-1,4-pregnadiene - 3,20 - dione (9α-methyl-1-dehydrohydrocortisone)* (XXIV)

A medium consisting of one percent dextrose hydrate, 2% cornsteep liquor of 60% solids and Kalamozoo tap water was adjusted to pH 4.9 with sodium hydroxide. The medium was steam sterilized at fifteen pounds' pressure for thirty minutes, cooled, and then inoculated with a 24-hour growth, from spores, of *Septomyxa affinis*, A.T.C.C. 6737. The medium was agitated, sparged with sterile air at the rate of one-tenth volume of air per volume of medium per minute. At the end of 24 hours of fermentation at room temperature, the pH was about 7.4. To this culture there was added a solution of 9α-methyl - 11β,17α - dihydroxy-21-acetoxy-4-pregnene-3,20-dione (9α-methylhydrocortisone acetate), dissolved in diethylformamide. The solution was prepared by dissolving five parts of the steroid in 100 parts of the solvent and adding about ten cc. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to a slightly viscous residue, which contained 9α-methyl-1-dehydrohydrocortisone (XXIV).

Alternatively, the 1-dehydrogenation can be carried out chemically in the manner known in the art by the use of selenium dioxide.

The residue, after reacetylation with acetic anhydride in pyridine, was fractionated chromatographically and 9α-methyl - 11β,17α - dihydroxy-21-acetoxy-1,4-pregnadiene-3,20-dione (XXIV) was recovered as a light-colored crystalline solid. Reacetylation of 9α-methyl-1-dehydrohydrocortisone with the appropriate anhydride of a hydrocarbon carboxylic acid or acyl halide in pyridine is productive of other 9α-methyl-1-dehydrohydrocortisone-21-acylates. Representative 21-acylates thus produced include the propionate, butyrate, valerate, hexanoate, heptanoate, octanoate, benzoate, phenylacetate, (β-cyclopentylpropionate), propiolate, trimethylacetate, dodecanoate, hemisuccinate, ethylbutyrate, cyclohexylacetate, laurate, lactate, crotanoate, maleate, and the like.

EXAMPLE 29

9α - methyl - 17α,21 - dihydroxy-1,4-pregnadiene-3,11,20-trione (9α-methyl-1-dehydrocortisone) (XXIV–11=O) and 9α - methyl - 17α,21 - dihydroxy - 1,4-pregnadiene-3,11,20-trione 21-acetate (9α-methyl-1-dehydrocortisone 21-acetate) (XXIV–11=O, 21—Ac)

Following the procedure of Example 28, but substituting 9α-methyl-17α,21-dihydroxy-4-pregnene-3,11,20-trione 21-acetate as the starting steroid is productive of 9α-methyl-1-dehydrocortisone, 9α-methyl-1-dehydrocortisone 21-acetate (XXIV–11=O, 21—Ac) or other 21-acylates disclosed at the end of Example 28.

EXAMPLE 29A 21-phosphates of 9α-methylhydrocortisone (XXXII–21—OH), 9α-methylcortisone (XXIII–11=O, 21—OH), 9α-methyl-1-dehydrohydrocortisone (XXIV) and 9α-methyl-1-dehydrocortisone (XXIV–11=O)

By use of the general methods of Zervas [Naturwissenschaften, 27, 317 (1939)] and Zervas and Dilaris [J. Amer. Chem. Soc., 77, 5354 (1955)], employing the reaction of silver dibenzyl phosphate with the 3-keto protected 21-halide of the appropriate steroid and subsequent displacement of the benzyl groups of the resulting triester by catalytic hydrogenation, 9α-methylhydrocortisone 21-phosphate, 9α-methylcortisone 21-phosphate, 9α-methyl-1-dehydrohydrocortisone 21-phosphate and 9α-methyl-1-dehydrocortisone 21-phosphate are prepared from the corresponding 21-acylates or 21-hydroxides.

EXAMPLE 30

9α - methyl-11β,17α,21-trihydroxy-4-pregnene-3,20-dione 21-methanesulfonate (XXIVa)

To a solution of 9α-methyl-11β,17α,21-trihydroxy-4-pregnene-3,20-dione (9α-methylhydrocortisone) (XXIII–21—OH) (prepared as in Example 20) in pyridine previously cooled to 0 to 5° C. there was added an appropriate volume of methanesulfonyl chloride. The reaction mixture was stirred in an ice-water bath for a period of about four hours. Dilution with 5% hydrochloric acid precipitated the crystalline mesylate (XXIVa).

EXAMPLE 31

9α - methyl - 21-iodo-11β,17α-dihydroxy-4-pregnene-3,20-dione (XXIVb)

A mixture of mesylate (XXIVa) and sodium iodide in acetone was heated under reflux for about 15 minutes. The solvent was distilled under vacuum, and the resulting 9α - methyl - 21-iodo-11β,17α-dihydroxy-4-pregnene-3,20-dione (XXIVb) was not purified but was employed in the crude state in the succeeding step of Example 32.

EXAMPLE 32

9α - methyl - 11β,17α - dihydroxy - 4-pregnene-3,20-dione (XXIVc)

The crude product from Example 31 above (XXIVb) was dissolved in acetic acid. After stirring continuously at room temperature for a period of about thirty minutes, sufficient 5% sodium thiosulfate solution was added to discharge the iodine color. The resulting colorless solution was poured into water containing potassium bicarbonate. The resulting crystals were collected by filtration. Several recrystallizations from ethyl acetate yielded pure 9α-methyl-11β,17α-dihydroxy-4-pregnene-3,20-dione (XXIVc).

EXAMPLE 33

9α-methyl-11β,17α-dihydroxy-1,4-pregnadiene-3,20-dione (XXIVc)

Following the procedures of Examples 30, 31, and 32, but substituting 9α-methyl-11β,17α,21-trihydroxy-1,4-pregnadiene-3,20-dione as the starting steroid is productive of 9α-methyl-11β,17α,21-trihydroxy - 1,4 - pregnadiene-3,20-dione 21-methanesulfonate, 9α-methyl-21-iodo-11β,17α-dihydroxy-1,4-pregnadiene-3,20-dione and 9α-methyl-11β,17α-dihydroxy-1,4-pregnadiene-3,20-dione (XXIVc).

EXAMPLE 34

9α-methyl-17α-hydroxy-4-pregnene-3,11,20-trione (XXIVd)

A mixture is prepared containing 9α-methyl-11β,17α-dihydroxy-4-pregnene-3,20-dione (XXIVc), chromium trioxide, glacial acetic acid and a small amount of water. This mixture was stirred and maintained for a period of about 8 hours at room temperature, then poured into ice water, neutralized with dilute sodium hydroxide, the resulting precipitate collected on a filter and recrystallized from a mixture of ethyl acetate and Skellysolve B to yield 9α-methyl-17α-hydroxy - 4 - pregnene - 3,11,20 - trione (XXIVd).

EXAMPLE 35

9α-methyl-17α-hydroxy-1,4-pregnadiene-3,11,20-trione (XXIVd)

Following the procedure of Example 34, but substituting 9α-methyl-11β,17α-dihydroxy-1,4-pregnadiene-3,20-dione (XXIVc) as the starting steroid is productive of 9α-methyl-17α-hydroxy - 1,4 - pregnadiene - 3,11,20 - trione (XXIVd).

It is to be understood that this invention is not to be limited to the exact details of operation or exact compounds shown and described, as obvious modifications and equivalents will be apparent to one skilled in the art. This invention is, therefore, to be limited only by the scope of the appended claims.

We claim:

1. 9α-methyl-5,7-pregnadiene - 3,11,20 - trione-3,20-bis (ethylene ketal) represented by the following formula:

2. 9α-methyl-4,7-pregnadiene-3,11,20-trione represented by the following formula:

3. 9α - methyl-5,7-pregnadiene-11β-hydroxy-3,20-dione- 3,20-bis(ethylene ketal) represented by the following formula:

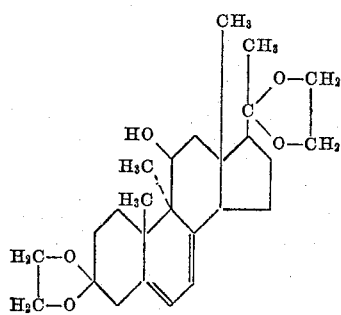

4. 9α-methyl-4,7-pregnadiene - 11β - hydroxy-3,20-dione represented by the following formula:

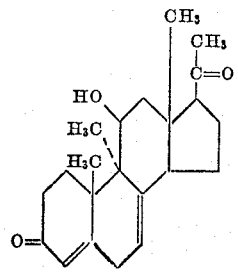

5. 9α - methyl-6-pregnene-5α,8α-dihydroxy-3,11,20-trione represented by the following formula:

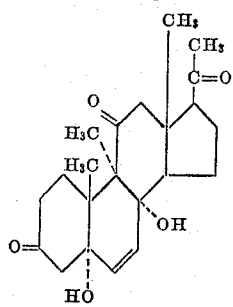

References Cited in the file of this patent

UNITED STATES PATENTS

| | | |
|---|---|---|
| 2,751,402 | Schneider | June 19, 1956 |
| 2,774,775 | Korman et al. | Dec. 18, 1956 |
| 2,774,776 | Hogg et al. | Dec. 18, 1956 |
| 2,844,513 | Wettstein et al. | July 22, 1958 |
| 2,862,936 | Lincoln et al. | Dec. 2, 1958 |
| 2,970,143 | Thomas et al. | Jan. 31, 1961 |

OTHER REFERENCES

Herz et al.: J.A.C.S. 78, 4812–13 (1956).
Hoffman et al.: 80 J.A.C.S., 5322–3 (October 1958).